United States Patent
Chao et al.

(10) Patent No.: US 11,392,470 B2
(45) Date of Patent: Jul. 19, 2022

(54) INFORMATION HANDLING SYSTEM TO ALLOW SYSTEM BOOT WHEN AN AMOUNT OF INSTALLED MEMORY EXCEEDS PROCESSOR LIMIT

(71) Applicant: DELL PRODUCTS, LP, Round Rock, TX (US)

(72) Inventors: Ching-Lung Chao, Austin, TX (US); Shih-Hao Shih-Hao Wang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 546 days.

(21) Appl. No.: 16/413,265

(22) Filed: May 15, 2019

(65) Prior Publication Data

US 2020/0364126 A1 Nov. 19, 2020

(51) Int. Cl.
*G06F 11/22* (2006.01)
*G06F 3/06* (2006.01)
*G06F 13/16* (2006.01)
*G06F 13/20* (2006.01)

(52) U.S. Cl.
CPC ........ *G06F 11/2284* (2013.01); *G06F 3/0604* (2013.01); *G06F 3/0653* (2013.01); *G06F 3/0673* (2013.01); *G06F 13/1668* (2013.01); *G06F 13/20* (2013.01)

(58) Field of Classification Search
CPC ................ G11C 11/4074; G06F 3/0679; G06F 13/4234
See application file for complete search history.

(56) References Cited

U.S. PATENT DOCUMENTS

| | | | |
|---|---|---|---|
| 2010/0191991 A1* | 7/2010 | Berke | G11C 11/4074 713/320 |
| 2014/0122856 A1 | 5/2014 | Berke et al. | |
| 2015/0113198 A1* | 4/2015 | Li | G06F 13/4234 711/2 |
| 2016/0246668 A1 | 8/2016 | Wang, III | |
| 2016/0378509 A1* | 12/2016 | Venkatasubba | G06F 9/50 713/2 |
| 2017/0004421 A1* | 1/2017 | Gatson | H04L 41/5038 |
| 2018/0113826 A1* | 4/2018 | Li | G06F 3/0622 |
| 2019/0205068 A1* | 7/2019 | Hsieh | G06F 3/0679 |

\* cited by examiner

Primary Examiner — Getente A Yimer
(74) Attorney, Agent, or Firm — Larson Newman, LLP

(57) ABSTRACT

An information handling system includes a processor, a plurality of dual in-line memory modules (DIMMs), and a basic input/output system (BIOS). During a power-on self-test (POST), the BIOS may read serial presence detect data from each of the DIMMs, determine a total amount of installed memory. The BIOS may determine whether the total amount of the installed memory exceeds a maximum memory capacity of the processor. If so, the BIOS may remove memory capacity of the DIMMs to create a second total amount of the installed memory that is less than the maximum memory capacity of the processor, configure a memory address decode register with the second total amount of the installed memory, and complete the POST.

20 Claims, 5 Drawing Sheets

INFORMATION HANDLING SYSTEM TO ALLOW SYSTEM BOOT WHEN AN AMOUNT OF INSTALLED MEMORY EXCEEDS PROCESSOR LIMIT

FIELD OF THE DISCLOSURE

The present disclosure generally relates to information handling systems, and more particularly relates to an information handling system to allow a system boot when an amount of installed memory exceeds a processor limit.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may include a processor, a plurality of dual in-line memory modules (DIMMs), and a basic input/output system (BIOS). During a power-on self-test (POST), the BIOS reads serial presence detect (SPD) data from each of the DIMMs, determines a total amount of installed memory based on the SPD data. The BIOS determines whether the total amount of the installed memory exceeds a maximum memory capacity of the processor. In response to the total amount of the installed memory exceeding the maximum memory capacity of the processor, the BIOS removes memory capacity of the DIMMs to create a second total amount of the installed memory that is less than the maximum memory capacity of the processor, performs a configuration of a memory address decode register with the second total amount of the installed memory, and completes the POST.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Systems and methods for allowing completion of a boot process when a total amount of installed memory exceeds a maximum memory capacity of a processor are disclosed herein. An information handling system includes multiple dual in-line memory modules (DIMMs), which may be installed to provide memory for access by the processor. During a power-on self-test (POST), a basic input/output system (BIOS) of the information handling system may read serial presence detect (SPD) data from each of the DIMMs. Based on the SPD data, the BIOS may determine a total amount of installed memory. Memory reference code (MRC) within the BIOS may determine a maximum memory capacity of the processor. Based on the determination of the maximum memory capacity of the processor, the MRC may determine whether the total amount of the installed memory exceeds a maximum memory capacity of the processor. In response to the total amount of the installed memory exceeding the maximum memory capacity of the processor, the MRC may remove memory capacity of the DIMMs to create a second total amount of the installed memory that is less than the maximum memory capacity of the processor, and may configure the memory address decode register with the second total amount of the installed memory, such that the POST may be completed.

These systems and methods to allow completion of a boot process when a total amount of installed memory exceeds a maximum memory capacity of a processor provide various advantages and benefits over other systems that may detect a total amount of installed memory that exceeds a maximum memory capacity of a processor. In particular, the MRC of the BIOS in the systems disclosed herein does not halt the system and get hung in the memory configuration portion of the POST when total amount of installed memory exceeds the maximum memory capacity of the processor, as is the result of other systems. Instead, the MRC may remove memory of the installed DIMMs so that the total amount of installed memory no longer exceeds the maximum memory capacity of the processor, such that the information handling system may boot. Additionally, the system disclosed herein may store error information and other information associated with the DIMMs that have been disabled. The system may display this information to an individual, such that the individual may be aware of the memory situation within the system. Whereas other previous systems do not provide information to the individual, such that the individual does not know why the boot process is halted without additional decoding of the problem.

Figure 1:
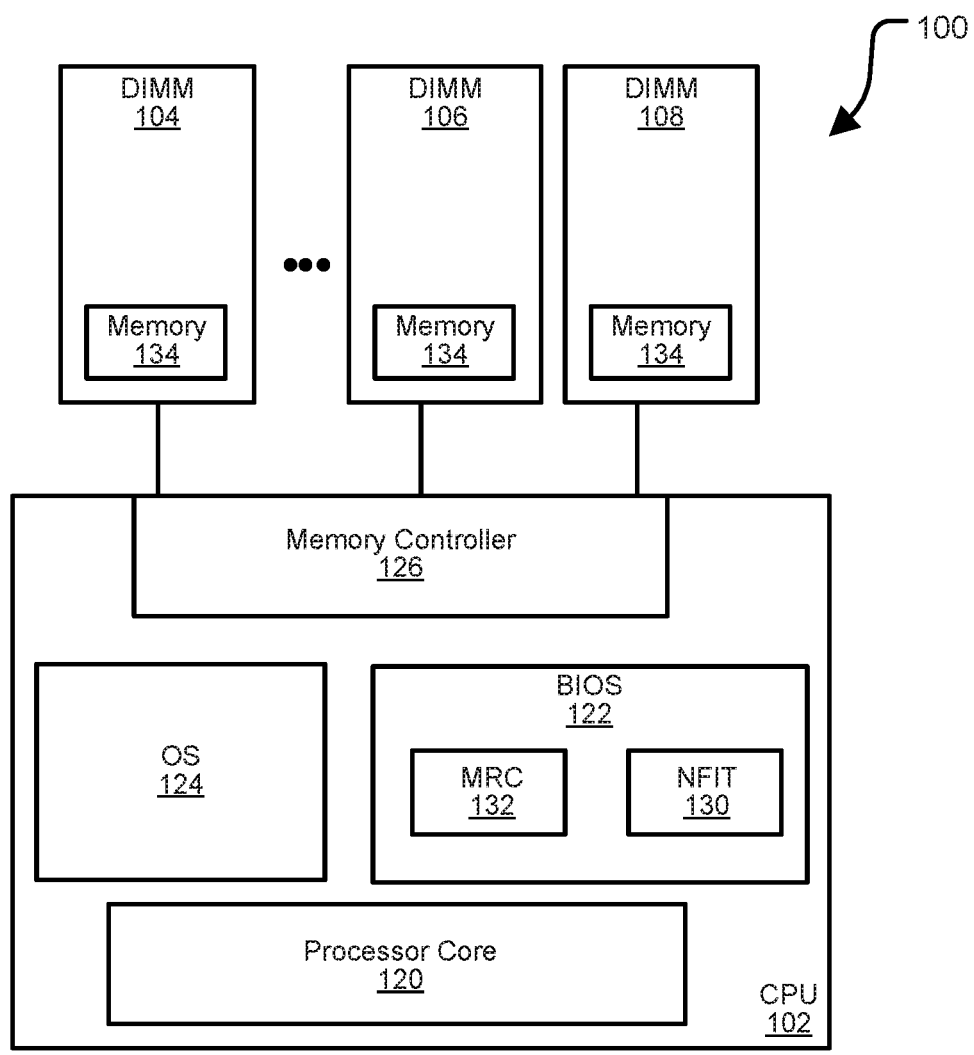
FIG. 1 is a block diagram of a portion of an information handling system according to at least one embodiment of the disclosure.

FIG. 1 shows a portion of an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

The information handling system 100 includes a CPU or processor 102 and dual in-line memory modules (DIMMs) 104, 106, and 108. In an embodiment, information handling system 100 may include additional components, not shown in or discussed with reference to FIG. 1, without varying from the scope of this disclosure. In an embodiment, the information handling system 100 can be a server, a personal computer, a laptop computer, or the like. The CPU 102 includes a processor core 120, a basic input/output system (BIOS) 122, an operating system (OS) 124, and a memory controller 126. In an embodiment, CPU 102 may include additional components, not shown in or discussed with reference to FIG. 1, without varying from the scope of this disclosure. BIOS 122 is firmware utilized during a boot process, such as a power-on self-test (POST), to initialize the hardware components within information handling system 100. In an embodiment, the hardware components within information handling system 100 initialized by BIOS 122 may include, but are not limited to, CPU 102 and DIMMs 104, 106, and 108. BIOS 122 may also provide runtime services for the OS 124 and other programs with CPU 102. BIOS 122 may include a non-volatile dual in-line memory module (NVDIMM) firmware interface table (NFIT) 130, and memory reference code (MRC) 132. In an embodiment, NFIT 130 can store information including, but not limited to, persistent memory ranges and properties for DIMMs 104, 106, and 108.

DIMMS 104, 106, and 108 may include one or more types of memory 134 accessible by CPU 102. For example, DIMMs 104, 106, and 108 may include dynamic random access memory (DRAM) and flash memory storage. In an embodiment, DIMMs 104, 106, and 108 may be implemented as one or more types of regular DIMMs with only volatile memory, or one or more types of non-volatile DIMMs (NVDIMMs). In an example, one or more types of NVDIMMs may include: NVDIMM-F including only persistent memory, such as flash storage, NVDIMM-N including both flash storage and DRAM on the same memory module, NVDIMM-P including persistent DRAM, and NVDIMM-X including NAND flash storage and DRAM on the same memory module. In this embodiment, DIMMs 104, 106, 108 may be Apache Pass (AEP) devices with memory 134 configured according to one of the memory types stated above, such as NVDIMM-F. One of ordinary skill in the art will recognize that while FIG. 1 illustrates DIMMs 104, 106, and 108, this disclosure is not limited to three DIMMs but can be applied to any number of DIMMs, as indicated by the ellipses in between DIMMs 104 and 106. In an embodiment, one or more of DIMMs 104, 106, and 108 may include additional components, not shown in or discussed with reference to FIG. 1, without varying from the scope of this disclosure.

CPU 102 may operate to provide data processing functionality of information handling system 100, such as is typically associated with an information handling system. As such, CPU 102 represents a data processing apparatus, such as one or more processor cores, and the associated data input and output (I/O) functionality, such as a chipset component, and other I/O processor components. CPU 102 operates to execute machine-executable code to perform the data processing tasks associated with information handling system 100.

Memory controller 126 represents a portion of a processor complex that is dedicated to the management of the data storage and retrieval from the memory devices of information handling system 100, and information handling system 100 may include one or more additional memory controllers similar to the memory controller 126, as needed or desired. Memory controller 126 may reside on a system printed circuit board, may be integrated into an I/O processor component, may be integrated with a processor on a system-on-a-chip (SoC), or may be implemented in another way, as needed or desired. Memory controller 126 operates to provide data and control interfaces to one or more DIMMs, such as DIMMs 104, 106, and 108, in accordance with a particular memory architecture. For example, memory controller 126 and the DIMMs 104, 106, and 108 may operate in accordance with a Double-Data Rate (DDR) standard, such as a JEDEC DDR4 or DDR5 standard.

In certain examples, before any usable memory 134 within DIMMs 104, 106, and 108 may be accessed by OS 124, BIOS 122 may perform a POST for information handling system 100. During the POST, BIOS 122 execute MRC 132 to access information associated with DIMMs 104, 106, and 108 and configure a memory address decode register for DIMMs 104, 106, and 108 as will be described herein. In an embodiment, the information associated with DIMMs 104, 106, and 108 stored within the memory address decode register may include, but is not limited to, a mode of operation for DIMMs 104, 106, and 108, and a total amount of memory for DIMMs 104, 106, and 108. The mode of operation can be an application-direct mode, a memory mode, a storage mode, or the like. In the application-direct mode, applications executed by processor core 120 via OS 124 can directly access data stored within DIMMs 104, 106, and 108. In the memory mode, a DRAM portion of DIMMs 104, 106, and 108 can be accessed by processor core 120 of CPU 102 to store data in DIMMs 104, 106, and 108. In the storage mode, data can be accessed in DIMMs 104, 106, and 108 in a block data format. These modes of operation can be set as attributes for DIMMs 104, 106, and 108 by the OS 124, by unified extensible firmware interface (UEFI) environment of BIOS 122, or the like. After the memory address decode register has been configured for DIMMs 104, 106, and 108 and other operations of POST have been completed, BIOS 122 may exit POST and processor core 120 may perform one or more runtime operations of OS 124.

Figure 2:
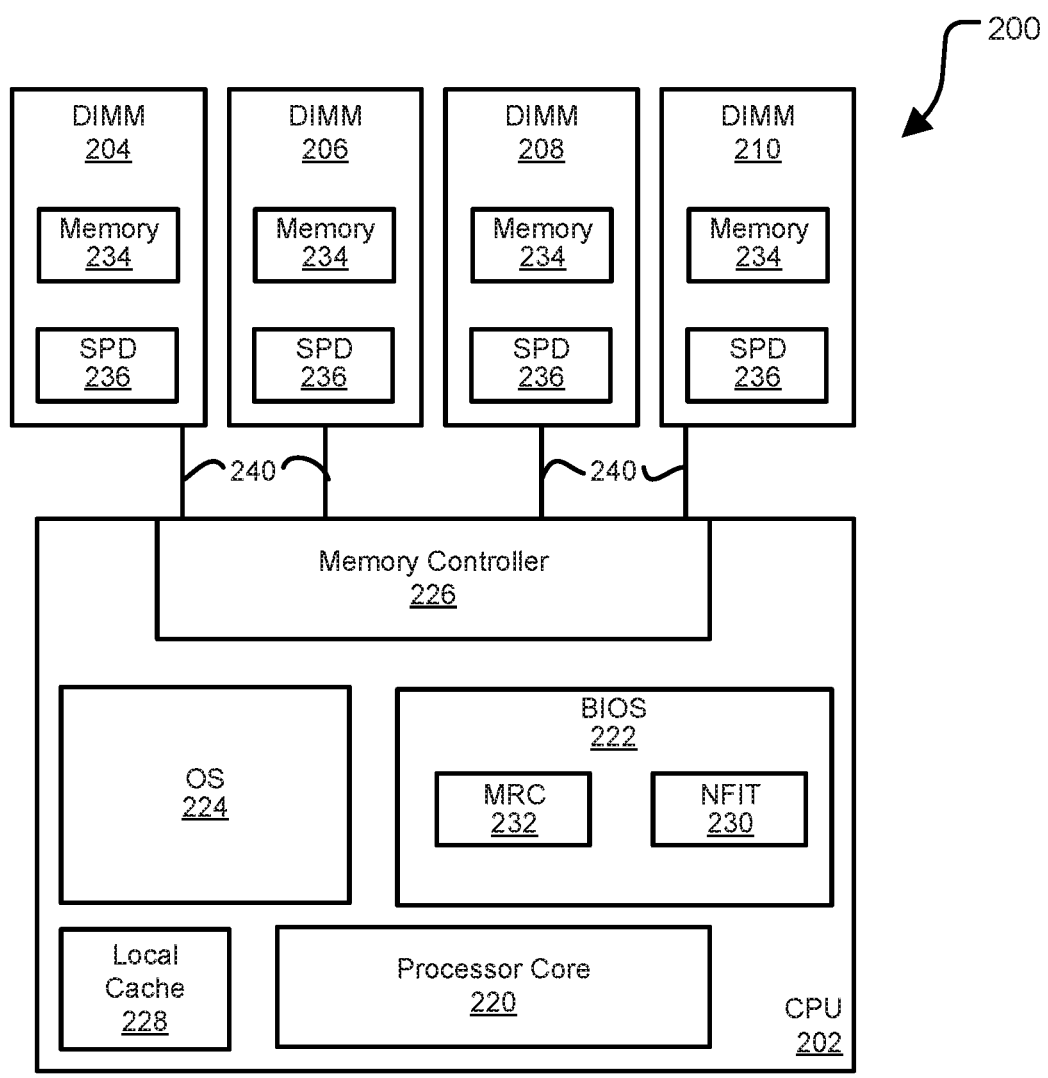
FIG. 2 is a block diagram of another portion of an information handling system according to at least one embodiment of the disclosure.

FIG. 2 illustrates a portion of an information handling system 200 including a CPU 202 and dual in-line memory modules (DIMMs) 204, 206, 208, and 210 (DIMMs 204-210). In an embodiment, information handling system 200 can be a server, a personal computer, a laptop computer, or the like, such as or substantially similar to information handling system 100 of FIG. 1. CPU 202 includes a processor core 220, a BIOS 222, an OS 224, a memory controller 226, and a local cache 228. Each of the DIMMs 204-210 includes memory 234 and serial presence detect (SPD) data 236. BIOS 222 may include a NFIT 230 and MRC 232. In an embodiment, information handling system 200 may include additional or fewer components, not shown in or discussed with reference to FIG. 2, without varying from the scope of this disclosure. For example, FIG. 2 illustrates 4 DIMMs 204-210 installed within information handling system 200. However, depending on an implementation of information handling system 200, more or less DIMMs, such as 6 to 2 DIMMs, may be installed within information handling system 200 without varying from the scope of this disclosure.

In an example, CPU 202 may separately communicate with each of the DIMMs 204-210 via one or more communication buses 240. In an embodiment, each communication bus 240, shown between CPU 202 and DIMM 204, 206, 208, or 210, may represent one or more different communication buses including, but not limited to, a System Management Bus (SMBus) and a Peripheral Component Interconnect (PCI).

In certain examples, different configurations of CPU 202 may support different amounts of total memory 234 within DIMMs 204-210. For example, CPU 202 may have any suitable number of configurations and each configuration may support a different amount of total memory 234. The total amount of memory supportable by CPU 202 will be referred to herein as a maximum memory capacity for CPU 202. In an embodiment, the different maximum memory capacities of CPU 202 may include, but are not limited to, 6 terabytes (TB), 5 TB, 4.5 TB, 4 TB, 3.5 TB, 2 TB, 1.5 TB, and 1 TB.

In an example, DIMMs 204-210 may include different amounts of memory 234 for access by CPU 202. In certain examples, DIMMs 204-210 may all include the same amount of memory 234, may all include different amounts of memory 234, or any combination of same and different amounts of memory 234 as may suit a particular purpose. In an embodiment, the amounts of memory within each DIMM 204-210 may include, but is not limited to, 2 TB, 1.5 TB, 1 TB, 512 gigabytes (GB), 256 GB, and 128 GB.

In an embodiment, based on the configurations of DIMMs 204-210 and the configuration of CPU 202, a problem may arise during a POST operation executed by BIOS 222 of information handling system 200. For example, if prior to the POST, an individual replaces CPU 202 or one or more of DIMMs 204-210, the total amount of memory 234 within DIMMs 204-210 and/or the maximum memory capacity of CPU 202 may change. In this example, the replacing of CPU 202 and/or one or more of DIMMs 204-210, may result in the total amount of memory 234 within DIMMs 204-210 exceeding the maximum memory capacity of CPU 202. The total amount of memory 234 exceeding the maximum memory capacity would result in a problem in previous information handling systems, because these previous systems would halt during the POST operations and merely output a message on a display device. In an example, the message would indicate "Configuring memory . . . " without providing any other information to an individual of the information handling system. In an example, the previous information handing system would get hung during the memory configuration stage of the POST, such that the previous information handing system would not complete the POST operations and not boot to runtime operations of the OS. Additionally, an individual associated with a previous information handling system would not know the cause, but would merely see the "Configuring memory . . . " message. However, BIOS 222 of information handling system 200 may allow the information handling system 200 to boot without halting the POST operations even when the total amount of memory 234 within DIMMs 204-210 exceeds the maximum memory capacity of CPU 202 as will be described herein.

During the POST, MRC 232 of BIOS 222 may perform one or more operations to configure memory 234 within DIMMs 204-210 in any suitable manner. In an example, MRC 232 is the portion of the BIOS 222 firmware that may configure how memory 234 will be read from and written to, may configure timing operations for communication between CPU 202 and DIMMs 204-210 via the memory controller 226, and may configure any other features of DIMMs 204-210 to enable access of memory 234 by CPU 202 as will be described herein.

In an example, DIMMs 204-210 may be any suitable type of DIMM described herein. In addition, DIMMs 204-210 may be registered or buffered DIMMs (RDIMMs), unregistered or unbuffered DIMMs (UDIMMs), or any combination of RDIMMs and UDIMMs. RDIMMs may include a register between DRAM modules, such as memory 234 in FIG. 2, of the DIMMs and the memory controller, such as memory controller 226 of FIG. 2, of the processor. The registers within the DIMMs may allow more DIMMs to be installed within an information handling system 200 while maintaining stability within the information handling system 200 as compared to UDIMMs. RDIMMs may also enable scalability within information handling system 200. UDIMMs do not include the register between the DRAM modules of the DIMMs and the memory controller.

In an embodiment, MRC 232 may receive information from each of the DIMMs 204-210 in any suitable manner. For example, MRC 232 may access data with SPD 236 of each of the DIMMs 204-210. The SPD 236 may be stored within an electrically erasable programmable read-only memory (EEPROM) of DIMMs 204-210. In an embodiment, the data within SPD 236 may include any suitable information about the corresponding DIMM 204, 206, 208, or 210. For example, the SPD data 236 may include, but is not limited to, a size of memory 234 within the DIMM, a type of DIMM (RDIMM or UDIMM), and timings for use with the DIMM.

In an example, MRC 232 may utilize the SPD data 236 in any suitable manner to configure memory 234 within DIMMs 204-210 for access by CPU 202. In an embodiment, based on the SPD data 236, MRC 232 may enable only those DIMMs of DIMMs 204-210 that are RDIMMs. Additionally, MRC 232 may utilize the SPD 236 from each of the DIMMs 204-210, to determine a total amount of memory 234 installed within information handling system 200. In an embodiment, data associated with the amount of memory 234 within each of the DIMMs 204-210 may be stored within the platform configuration data (PCD) of the DIMM. In an example, the amount of memory 234 within each of the DIMMs 204-210 may be any suitable amount as stated above, such as 512 GB. In this example, the total amount of memory 234 installed within information handling system 200 may be 512 GB for each of the DIMMs 204, 206, 208, and 210 or 2 TB of total memory 234 across all DIMMs 204-210.

In an embodiment, based on the determination of the total amount of installed memory 234, MRC 232 may begin to configure a memory address decode register within BIOS 222 for the installed memory 234 of DIMMs 204-210. For example, MRC 232 may write the total amount of installed memory 234 within the memory address decode register. In an embodiment, the memory address decode register may be with a memory map structure of memory controller 226, such as in a system address decoder (SAD) within memory controller 226. During the configuration of the memory address decode register, MRC 232 may determine a maximum memory capacity for CPU 202 in any suitable manner including, but not limited to, accessing a register associated with the maximum memory capacity. In an embodiment, the maximum memory capacity for CPU 202 may be any suitable amount based on the configuration of CPU 202 as stated above, such as 1 TB.

In an embodiment, MRC 232 may compare the total amount of installed memory 234 with the maximum memory capacity of CPU 202, and perform one or more operations based on the comparison. If the total amount of installed memory 234 does not exceed the maximum memory capacity of CPU 202, MRC 232 may complete the configuration of the memory address decode register and BIOS 222 may complete the POST such that information handling system 200 may boot and processor core 120 may begin runtime operations within OS 224. In an embodiment, if the total amount of installed memory 234 does exceed the maximum memory capacity of CPU 202, MRC 232 does not halt the system, as was the result in previous information handling systems.

Instead, MRC 232 may perform one or more operations to remove capacity of the installed memory 234. In an embodiment, MRC 232 may remove capacity of the installed memory 234 in any suitable level of granularity including, but not limited to, one or more DRAMs within a single DIMM and an entire DIMM. Continuing with the examples given above, the maximum memory capacity for CPU 202 may be 1 TB and each of the DIMMs 204-210 may include 512 GB of installed memory. In this example, the total amount of installed memory 234 will be 2 TB which is over the maximum memory capacity of 1 TB for CPU 202. Thus, MRC 232 may remove capacity of the installed memory 234. For example, MRC 232 may disable two of DIMMs 204-210, such as DIMMs 204 and 206, so that MRC 232 may create a second total amount of installed memory 234 of 1 TB that does not exceed the maximum memory capacity for CPU 202.

Based on the second total amount of installed memory 234 not exceeding the maximum memory capacity of CPU 202, MRC 232 may configure memory address decode register based on the second total amount of installed memory 234. For example, MRC 232 may write the second total amount of installed memory 234 within the memory address decode register in memory controller 226.

In an embodiment, MRC 232 may complete the memory configuration and store error information associated with the original amount of installed memory 234 of DIMMs 204-210 exceeding the maximum memory capacity of CPU 202. MRC 232 may also store information associated with the disabled DIMMs 204 and 206. In an embodiment, MRC 232 may store and log this information in any suitable manner. For example, MRC 232 may log the information to any suitable memory including, but not limited to, local cache 228 of CPU 202, and a memory of a baseboard management controller of information handling system 200.

In response to the completion of the memory configuration, BIOS 222 may complete the POST and perform one or more other operations. In an embodiment, a pop-up message, such as a warning message 304 of FIG. 3 may be provided at any suitable time. For example, warning message 304 may be provided at the completion of the POST, at a later POST of the information handling system 200, or the like. Thus, BIOS 222 and MRC 232 may allow information handling system 200 to boot when the total amount of installed memory 234 of DIMMs 204-210 exceeds a maximum memory capacity of CPU 202 by disabling one or more DIMMs until a total amount of installed, and enabled, memory 234 no longer exceeds the maximum memory capacity of CPU 202. After the memory address decode register has been reconfigured for enabled DIMMs, such as DIMMs 208 and 210, and other operations of POST have been completed, BIOS 222 may exit POST and processor core 220 may perform one or more runtime operations of OS 224.

Figure 3:
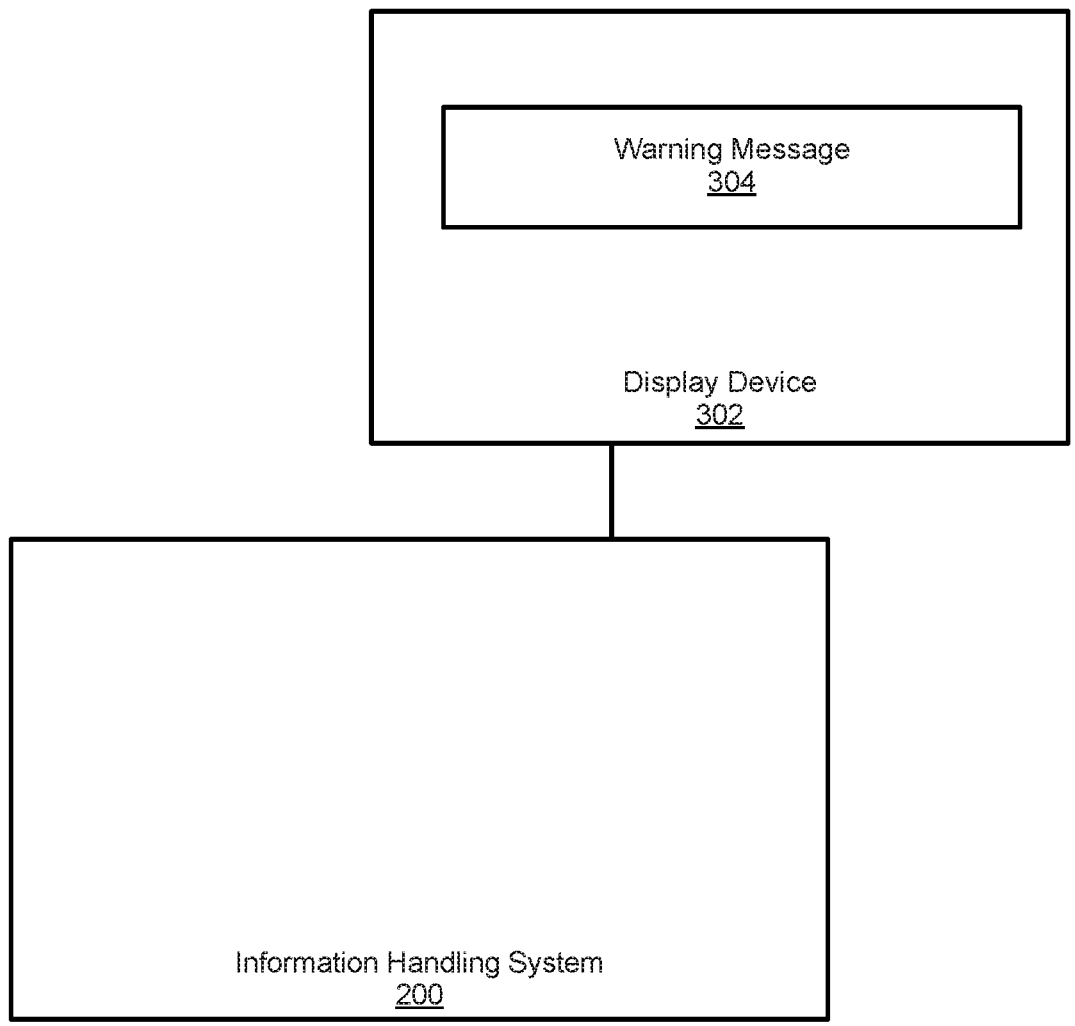
FIG. 3 is a block diagram of the information handling system of FIG. 2 in communication with a display device according to at least one embodiment of the disclosure.

FIG. 3 illustrates information handling system 200 in communication with a display device 302 according to at least one embodiment of the disclosure. In an embodiment, information handling system 200 may log the warning message 304 to a baseboard management controller, such as baseboard management controller 580 of FIG. 5. In addition, warning message 304 may be displayed on display device 302 for viewing by an individual associated with information handling system 200. In certain examples, warning message 304 may be based on the information stored in local cache 228 by MRC 232 as described with respect to FIG. 2. In an embodiment, warning message 304 may indicate that one or more of DIMMs 204-210 installed within information handling system 200 have been disabled due to the total amount of installed memory 234 exceeding the maximum memory capacity of CPU 202. Thus, individuals associated with information handling system 200 may be informed that the total amount of installed memory 234 exceeds the maximum memory capacity of CPU 202, and may decide what actions, if any, to perform to make correct this issue, such as replace CPU 202 or one or more of DIMMs 204-210.

Figure 4:
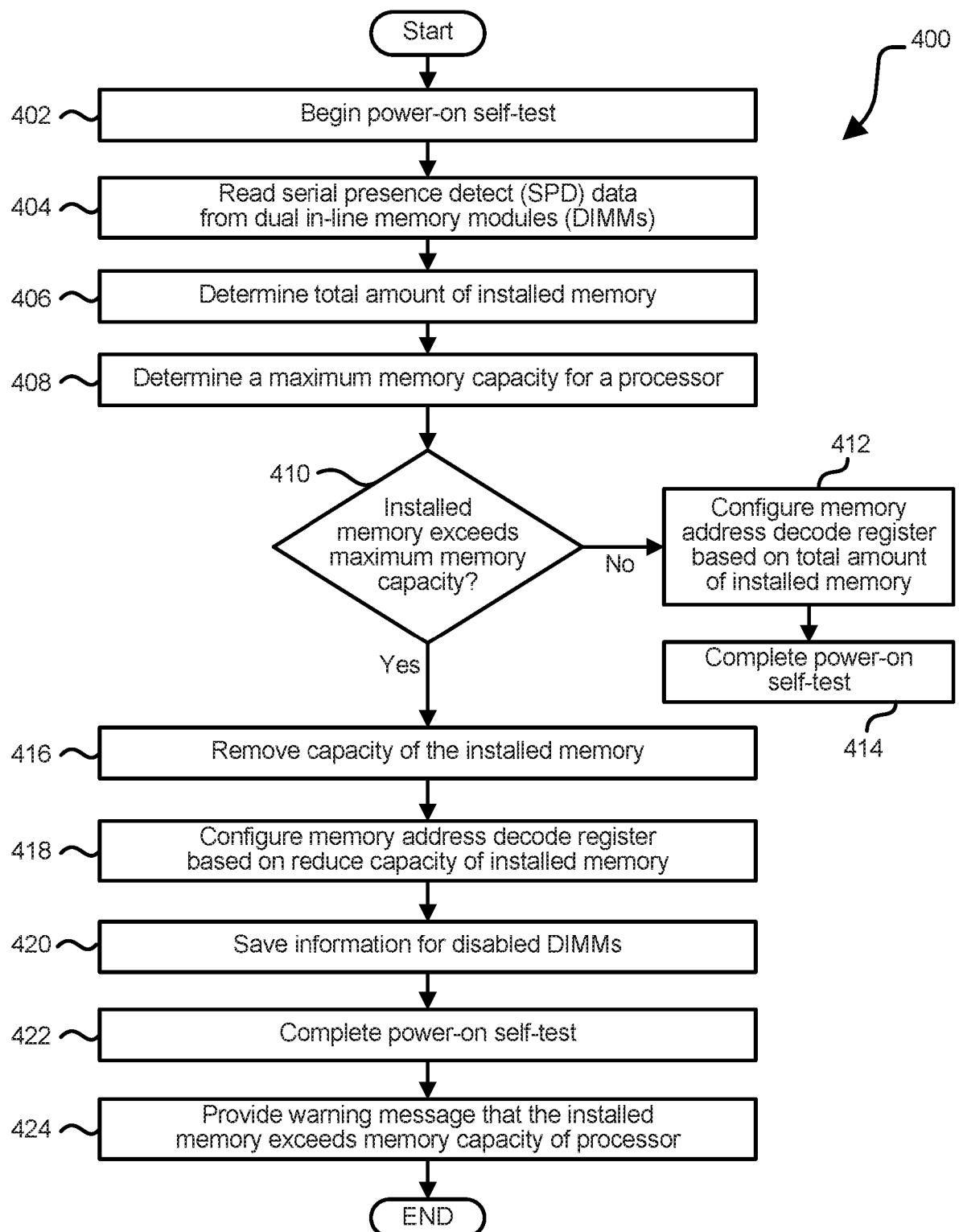
FIG. 4 is a flow diagram of a method for allowing an information handling system to boot when a total amount of installed memory exceeds a processor limit according to at least one embodiment of the present disclosure.

FIG. 4 illustrates a flow diagram of a method 400 for allowing an information handling system to boot when a total amount of installed memory exceeds a processor limit according to at least one embodiment of the present disclosure. It will be readily appreciated that not every method step set forth in this flow diagram is always necessary, and that certain steps of the methods can be combined, performed simultaneously, in a different order, or perhaps omitted, without varying from the scope of the disclosure.

At block 402, a POST is begun. Block 402 may be performed in a manner described above. For example, a BIOS of an information handling system may start the POST for the information handling system in response to the information handling system first receiving power.

At block 404, SPD data is read from each DIMM installed within the information handling system. Block 404 may be performed in a manner described above. In an embodiment, a MRC of the BIOS may read the SPD data to collect information associated with the installed DIMMs. In an example, the information from the SPD data may be utilized by the MRC and BIOS to configure the memory of the DIMMs for access by a CPU of the information handling system. In an embodiment, the information from the SPD data may include, but is not limited to, the type of DIMM, timing information for the DIMM, and amount of memory in the DIMM.

At block 406, a total amount of installed memory is determined. Block 406 may be performed in a manner described above. For example, the total amount of installed memory is determined by adding together the amount of memory in each of the DIMMs.

At block 408, a maximum memory capacity of the CPU is determined. Block 408 may be performed in a manner described above. In an embodiment, the maximum memory capacity may be read by BIOS from a register within CPU.

At block 410, a determination is made whether the total amount of installed memory exceeds the maximum memory capacity for the CPU. Block 410 may be performed in a manner described above. In response to the total amount of installed memory not exceeding the maximum memory capacity, a memory address decode register is configured based on the installed memory at block 412. Block 412 may be performed in a manner described above. In an example, the configuration of the memory address decode register may include writing the total amount of installed memory into a memory map structure of the BIOS. The total amount of installed memory and other information stored during the configuration of the memory address decode register may be utilized in configuring how the CPU may communicate with the DIMMs. The POST is completed at block 414. Block 414 may be performed in a manner described above.

In response to the total amount of memory exceeding the maximum memory capacity of the CPU, capacity of the installed memory may be removed at block 416. Block 416 may be performed in a manner described above. In an embodiment, the memory capacity may be removed by disabling one or more DIMMs installed within the information handling system. In certain examples, the DIMMs may be disabled on a one-by-one basis until a new total amount of installed memory of enabled DIMMs no longer exceeds the maximum memory capacity.

At block 418, the memory address decode register is configured. Block 418 may be performed in a manner described above. In an embodiment, the memory address decode register may be configured based on the new total amount of installed memory being written into the memory address decode register. The new total amount of installed memory and other information stored during the configuration of the memory address decode register may be utilized in configuring how the CPU may communicate with the DIMMs. In an example, based on the new total amount of installed memory not exceeding the maximum memory capacity, the memory configuration of the DIMMs may be completed.

At block 420, information associated with the disabled DIMMs is saved. Block 420 may be performed in a manner described above. In an embodiment, the information may be store in a local cache of the CPU. In an example, error information, such as information that the original total amount of installed memory exceeds the maximum memory capacity, may also be stored.

At block 422, the POST may be completed. Block 422 may be performed in a manner described above. At block 424, a warning message may be provided. Block 424 may be performed in a manner described above. In an example, the warning message may be provided to and logged within a memory within the information handling system. Additionally or alternatively, the warning message may also be provided on a display device of the information handling system. In an embodiment, the warning message may indicate that the total amount of installed memory exceeds the maximum memory capacity of the CPU. Additionally or alternatively, the warning message may provide information associated with the disabled DIMMs.

Figure 5:
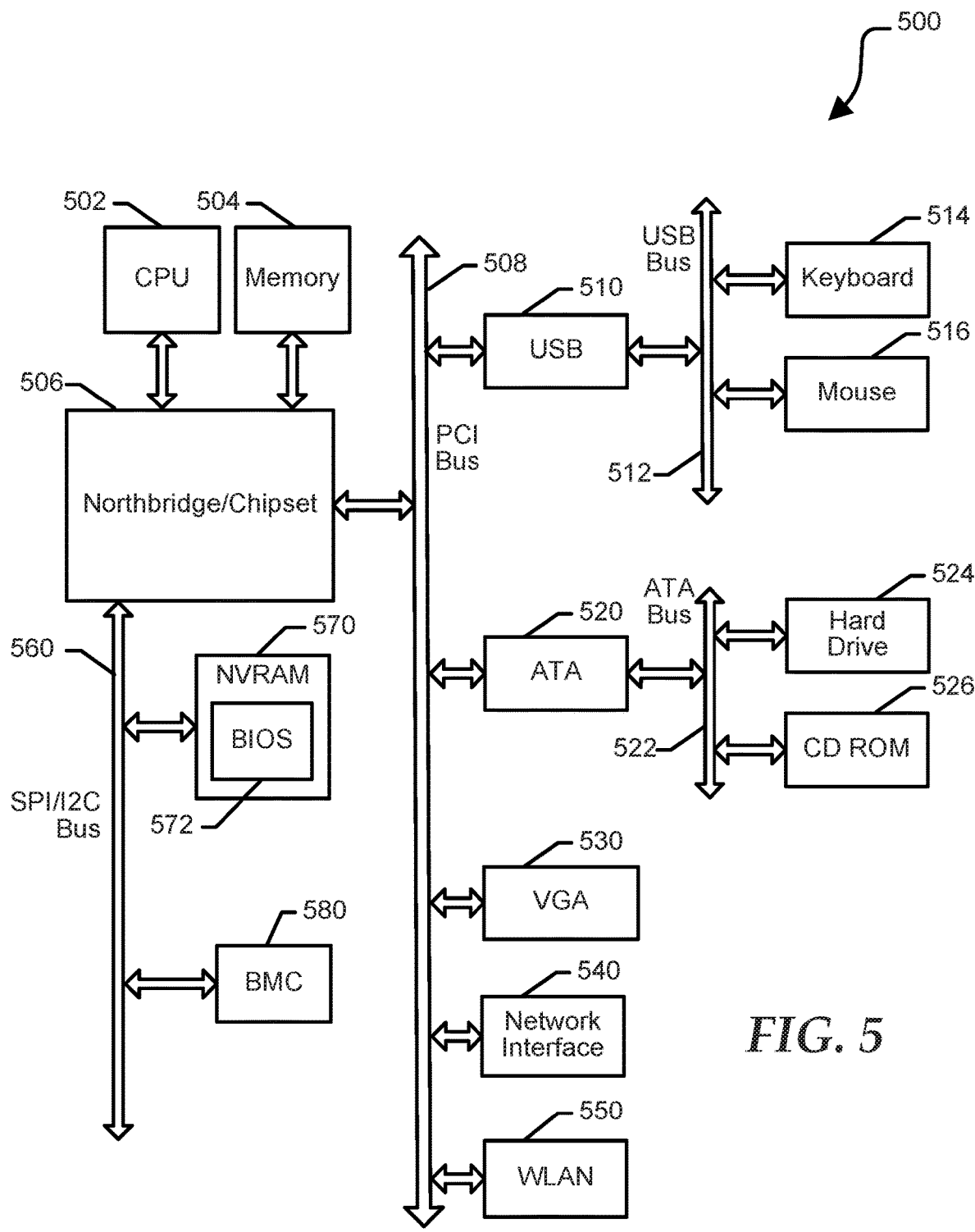
FIG. 5 is a block diagram of a general information handling system according to an embodiment of the present disclosure.

FIG. 5 illustrates a general information handling system 500 including a processor 502, a memory 504, a northbridge/chipset 506, a PCI bus 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. In an embodiment, information handling system 500 may be information handling system 100 of FIG. 1 and/or information handling system 200 of FIG. 2. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   during a power-on self-test (POST) of an information handling system:
      reading, by a basic input/output system, serial presence detect (SPD) data from each of a plurality of dual in-line memory modules (DIMMs) installed to communicate with a processor of the information handling system;
      determining a first total amount of installed memory based on the SPD data;
      determining whether the first total amount of the installed memory exceeds a maximum memory capacity of the processor; and
      in response to the first total amount of the installed memory exceeding the maximum memory capacity of the processor, removing memory capacity of the DIMMs to create a second total amount of the installed memory that is less than the maximum memory capacity of the processor; and
   completing the POST.

2. The method of claim 1, wherein removing memory capacity of the DIMMs to create the second total amount of the installed memory that is less than the maximum memory capacity comprises:
   disabling at least one DIMM of the DIMMs to remove an entire amount of memory for the at least one DIMM from the first total amount of the installed memory to create the second total amount of the installed memory.

3. The method of claim 2, further comprising:
   saving information associated with the disabled at least one DIMM.

4. The method of claim 1, further comprising:
   prior to completing the POST:
      saving error information indicating an amount of the first total amount of the installed memory that exceeds the maximum memory capacity.

5. The method of claim 1, further comprising:
   providing a warning message on a display device of the information handling system, the warning message indicating that at least one of the DIMMs installed within the information handling system is disabled due to the first total amount of the installed memory exceeding the maximum memory capacity of the processor.

6. The method of claim 1, further comprising:
   logging a warning message to a memory of the information handling system, the warning message to indicate that at least one of the DIMMs installed within the information handling system is disabled due to the first total amount of the installed memory exceeding the maximum memory capacity of the processor.

7. An information handling system comprising:
   a processor;
   a plurality of dual in-line memory modules (DIMMs) installed to communicate with the processor, the DIMMs to provide memory for access by the processor; and
   a basic input/output system (BIOS) to communicate with the DIMMs and the processor, and during a power-on self-test (POST) the BIOS to: read serial presence detect (SPD) data from each of the DIMMs; determine a total amount of installed memory based on the SPD data; determine whether the total amount of the installed memory exceeds a maximum memory capacity of the processor; in response to the total amount of the installed memory exceeding the maximum memory capacity of the processor, to remove memory capacity of the DIMMs to create a second total amount of the installed memory that is less than the maximum memory capacity of the processor; to perform a configuration of a memory address decode register with the second total amount of the installed memory; and to complete the POST.

8. The information handling system of claim 7, wherein the BIOS to disable at least one DIMM of the DIMMs to remove an entire amount of memory for the at least one DIMM from the first total amount of the installed memory to create the second total amount of the installed memory.

9. The information handling system of claim 8, further comprising:
   a local cache of the processor; and
   the BIOS to save information associated with the disabled at least one DIMM to the local cache.

10. The information handling system of claim 7, further comprising:
    a local cache of the processor; and
    prior to completing the POST, the BIOS to save error information indicating an amount of the first total amount of the installed memory that exceeds the maximum memory capacity to the local cache.

11. The information handling system of claim 7, the BIOS further to provide a warning message on a display device of the information handling system, the warning message to indicate that at least one of the DIMMs installed within the information handling system is disabled due to the first total amount of the installed memory exceeding the maximum memory capacity of the processor.

12. The information handling system of claim 7, the BIOS further to log a warning message to a memory of the information handling system, the warning message to indicate that at least one of the DIMMs installed within the information handling system is disabled due to the first total amount of the installed memory exceeding the maximum memory capacity of the processor.

13. The information handling system of claim 7, wherein the configuration the memory address decode register for the installed memory based on memory reference code within the BIOS.

14. A method comprising:
    during a power-on self-test (POST) of an information handling system:

reading, by a basic input/output system (BIOS), serial presence detect (SPD) data from each of a plurality of dual in-line memory modules (DIMMs) installed to communicate with a processor of the information handling system;

determining a first total amount of installed memory based on the SPD data;

determining whether the first total amount of the installed memory exceeds a maximum memory capacity of the processor;

in response to the first total amount of the installed memory not exceeding the maximum memory capacity of the processor, configuring a memory address decode register with the first total amount of the installed memory; and in response to the first total amount of the installed memory exceeding the maximum memory capacity of the processor:

removing memory capacity of the DIMMs to create a second total amount of the installed memory less than the maximum memory capacity of the processor; and configuring the memory address decode register with the second total amount of the installed memory; and completing the POST.

15. The method of claim 14, wherein removing memory capacity of the DIMMs to create the second total amount of the installed memory that is less than the maximum memory capacity comprises:

disabling at least one DIMM of the DIMMs to remove an entire amount of memory for the at least one DIMM from the first total amount of the installed memory to create the second total amount of the installed memory.

16. The method of claim 14, further comprising:

saving information associated with the disabled at least one DIMM.

17. The method of claim 14, further comprising:

prior completing the POST:

saving error information indicating an amount of the first total amount of the installed memory that exceeds the maximum memory capacity.

18. The method of claim 14, further comprising:

providing a warning message on a display device of the information handling system, the warning message indicating that at least one of the DIMMs installed within the information handling system is disabled due to the first total amount of the installed memory exceeding the maximum memory capacity of the processor.

19. The method of claim 14, further comprising:

logging a warning message to a memory of the information handling system, the warning message to indicate that at least one of the DIMMs installed within the information handling system is disabled due to the first total amount of the installed memory exceeding the maximum memory capacity of the processor.

20. The method of claim 14, wherein the configuring of the memory address decode register for the installed memory is performed by memory reference code within the BIOS.

\* \* \* \* \*